(12) United States Patent
Nyfors et al.

(10) Patent No.: US 11,897,975 B2
(45) Date of Patent: Feb. 13, 2024

(54) MULTI-STAGE PROCESS FOR PRODUCING A C2 TO C8 OLEFIN POLYMER COMPOSITION

(71) Applicant: BOREALIS AG, Vienna (AT)

(72) Inventors: Klaus Nyfors, Porvoo (FI); Vasileios Kanellopoulos, Linz (AT); Erno Elovainio, Porvoo (FI); Ravindra Tupe, Porvoo (FI); Victor Sumerin, Porvoo (FI)

(73) Assignee: BOREALIS AG, Vienna (AT)

( * ) Notice: Subject to any disclaimer, the term of this patent is extended or adjusted under 35 U.S.C. 154(b) by 334 days.

(21) Appl. No.: 17/273,325

(22) PCT Filed: Sep. 19, 2019

(86) PCT No.: PCT/EP2019/075109
§ 371 (c)(1),
(2) Date: Mar. 4, 2021

(87) PCT Pub. No.: WO2020/064484
PCT Pub. Date: Apr. 2, 2020

(65) Prior Publication Data
US 2021/0317236 A1 Oct. 14, 2021

(30) Foreign Application Priority Data
Sep. 28, 2018 (EP) .................................... 18197567

(51) Int. Cl.
*C08F 10/02* (2006.01)
*C08F 2/00* (2006.01)
*C08F 2/34* (2006.01)
*C08F 4/02* (2006.01)
*C08F 4/64* (2006.01)
*C08F 210/02* (2006.01)
*C08F 210/06* (2006.01)
*C08F 210/14* (2006.01)

(52) U.S. Cl.
CPC ............... *C08F 2/001* (2013.01); *C08F 2/34* (2013.01); *C08F 4/022* (2013.01); *C08F 4/64* (2013.01); *C08F 210/02* (2013.01); *C08F 210/06* (2013.01); *C08F 210/14* (2013.01)

(58) Field of Classification Search
CPC ...... C08F 10/02; C08F 110/02; C08F 210/02; C08F 2/001; C08F 2/34
See application file for complete search history.

(56) References Cited

U.S. PATENT DOCUMENTS

| | | | |
|---|---|---|---|
| 4,107,414 A | 8/1978 | Giannini et al. | |
| 4,186,107 A | 1/1980 | Wagner | |
| 4,226,963 A | 10/1980 | Giannini et al. | |
| 4,347,160 A | 8/1982 | Epstein et al. | |
| 4,382,019 A | 5/1983 | Greco | |
| 4,435,550 A | 3/1984 | Jeno et al. | |
| 4,465,782 A | 8/1984 | McKenzie | |
| 4,472,524 A | 9/1984 | Albizzati | |
| 4,473,660 A | 9/1984 | Albizzati et al. | |
| 4,522,930 A | 6/1985 | Albizzati et al. | |
| 4,530,912 A | 7/1985 | Pullukat et al. | |
| 4,532,313 A | 7/1985 | Matlack | |
| 4,560,671 A | 12/1985 | Gross et al. | |
| 4,581,342 A | 4/1986 | Johnson et al. | |
| 4,657,882 A | 4/1987 | Karayannis et al. | |
| 5,208,109 A * | 5/1993 | Bailly | C08F 10/02 526/124.8 |
| 5,539,067 A | 7/1996 | Parodi et al. | |
| 5,618,771 A | 4/1997 | Parodi et al. | |
| 5,733,989 A * | 3/1998 | Pentti | C08F 10/00 526/903 |
| 8,288,481 B2 * | 10/2012 | Fiebig | C08L 23/142 525/240 |
| 8,557,917 B2 * | 10/2013 | Leskinen | C08F 10/06 525/247 |
| 9,403,926 B2 * | 8/2016 | Alastalo | C08F 210/06 |
| 9,469,700 B2 * | 10/2016 | Kallio | C08F 4/65912 |
| 9,475,890 B2 * | 10/2016 | Kallio | C08F 210/06 |
| 10,961,334 B2 * | 3/2021 | Liu | C08F 4/6494 |
| 11,015,003 B2 * | 5/2021 | Hjärtfors | C08F 2/001 |
| 11,254,809 B2 * | 2/2022 | Liu | C08L 23/16 |
| 11,370,905 B2 * | 6/2022 | Wang | C08L 23/16 |
| 11,407,886 B2 * | 8/2022 | Toltsch | C08L 23/16 |
| 2020/0369861 A1 * | 11/2020 | Gahleitner | C08F 210/06 |
| 2021/0108058 A1 * | 4/2021 | Leskinen | C08L 23/142 |
| 2021/0317290 A1 * | 10/2021 | Liu | C08F 210/16 |

FOREIGN PATENT DOCUMENTS

| | | |
|---|---|---|
| EP | 0045977 B2 | 1/1987 |
| EP | 0045975 B1 | 4/1989 |

(Continued)

OTHER PUBLICATIONS

Applicant: Borealis AG; European Patent Application No. 18197567; "A Multi-Stage Process for Producing a C2 to C8 Olefin Polymer Composition"; Extended European Search Report; Examiner Dominik Thomas; dated Mar. 15, 2019; 6 pgs.

Vassileios Kannellopoulos, et al.; "Comprehensive Analysis of Single-Particle Growth in Heterogeneous Olefin Polymerization: The Random-Pore Polymeric Flow Model"; Ind. Eng. Chem. res. 2004, 43, 5166-5180.

Vassileios Kanellopoulos, et al.; "Gas-Phase Olefin Polymerization in the Presence of Supported and Self-Supported Ziegler-Natta Catalysts"; Macromolecular Reaction Engineering; Macromolecular Journals; 2008, 2, 240-252; DOI: 10.1002/mren.200700050.

*Primary Examiner* — Rip A Lee (74) *Attorney, Agent, or Firm* — TAROLLI, SUNDHEIM, COVELL & TUMMINO L.L.P.

(57) ABSTRACT

The present invention relates to a multi-stage process for producing a $C_2$ to $C_8$ olefin polymer composition in a process comprising at least two reactors, wherein a pre-polymerized solid Ziegler-Natta catalyst is prepared by carrying out an off-line pre-polymerization of a solid Ziegler-Natta catalyst component with a $C_2$ to $C_4$ olefin monomer before feeding to the polymerization process.

15 Claims, 1 Drawing Sheet

(56) References Cited

FOREIGN PATENT DOCUMENTS

| | | |
|---|---|---|
| EP | 0045976 B2 | 11/1989 |
| EP | 06887984 B1 | 8/1998 |
| EP | 0810235 B1 | 11/2004 |
| EP | 0887379 B1 | 12/2004 |
| EP | 2186833 B8 | 3/2012 |
| EP | 2 245 956 A1 * | 5/2012 ............ C08F 10/06 |
| EP | 2860203 B1 | 12/2016 |
| EP | 2610271 B2 | 3/2019 |
| JP | 2011195661 A | 10/2011 |
| WO | 1987/007620 A1 | 12/1987 |
| WO | 92/12182 A1 | 7/1992 |
| WO | 1992/19653 A1 | 11/1992 |
| WO | 1992/19658 A1 | 11/1992 |
| WO | 1992/19659 A1 | 11/1992 |
| WO | 92/21705 A1 | 12/1992 |
| WO | 93/11165 A1 | 6/1993 |
| WO | 93/11166 A1 | 6/1993 |
| WO | 1993/019100 A1 | 9/1993 |
| WO | 1994/026794 A1 | 11/1994 |
| WO | 1995/32994 A1 | 12/1995 |
| WO | 1997/036939 A1 | 10/1997 |
| WO | 98/12234 A1 | 3/1998 |
| WO | 99/24478 A1 | 5/1999 |
| WO | 99/24479 A1 | 5/1999 |
| WO | 99/33842 A1 | 7/1999 |
| WO | 1999/051646 A1 | 10/1999 |
| WO | WO 00/47636 A2 * | 8/2000 ............ C08F 10/00 |
| WO | 00/68315 A1 | 11/2000 |
| WO | WO 01/04166 A1 * | 1/2001 ............ C08F 10/06 |
| WO | WO 01/25296 A1 * | 4/2001 ............ C08F 10/00 |
| WO | 2001/055230 A1 | 8/2001 |
| WO | 2003/000754 A1 | 1/2003 |
| WO | 2003/000755 A1 | 1/2003 |
| WO | 2003/000756 A1 | 1/2003 |
| WO | 2003/000757 A1 | 1/2003 |
| WO | 2004/000899 A1 | 12/2003 |
| WO | 2004/029112 A1 | 4/2004 |
| WO | 2004/111095 A1 | 12/2004 |
| WO | 2005/118655 A1 | 12/2005 |
| WO | WO 2009/040201 A1 * | 4/2009 ............ C08L 23/14 |
| WO | 2012/007430 A1 | 1/2012 |
| WO | 2014/096296 A1 | 6/2014 |
| WO | 2014/0102128 A1 | 7/2014 |
| WO | 2016/097193 A1 | 6/2016 |
| WO | 2017/207493 A1 | 12/2017 |
| WO | WO 2017/207493 A1 * | 12/2017 ............ C08L 23/08 |

* cited by examiner

MULTI-STAGE PROCESS FOR PRODUCING A C2 TO C8 OLEFIN POLYMER COMPOSITION

The present invention relates to a multi-stage process for producing a $C_2$ to $C_8$ olefin polymer composition in a process comprising at least two reactors, wherein a pre-polymerized solid Ziegler-Natta catalyst is prepared by carrying out an off-line pre-polymerization of a solid Ziegler-Natta catalyst component with a $C_2$ to $C_4$ olefin monomer before feeding to the polymerization process.

The diversity of available polyolefin grades has been the result of advances in both the development of novel catalytic systems (e.g., Ziegler-Natta (Z-N), metallocenes, etc.) and the use of new reactor configurations (e.g., multi-stage reactors) and operating conditions. Current polyolefin manufacturing processes take advantage of high-yield catalysts and cascade-reactor technologies to produce polyolefins with desired molecular (e.g., bimodal molecular weight distribution, BMWD, reverse chemical composition distribution, reverse CCD, etc.) and morphological properties (i.e., particle size distribution, PSD) at a low production cost.

In many applications, polyolefins such as polypropylenes or polyethylenes are the material of choice as they can be tailored to specific purposes needed. Such polyolefins can be suitable prepared in a multi-stage process comprising at least two polymerization stages. Such process used for preparing polyethylene or polypropylene grades are typically based on at least two reactors in series to give a bi/multimodal capability that is desired for e.g. achieving easy processing resins and other desired end-use properties. In particular, the process may comprise a combination of at least one slurry reactor followed by a fluidized bed reactor allowing the preparation of a broad range of polyolefins. Process configurations comprising of at least 3 reactors are also known, like a process configuration with two slurry and one gas phase reactors especially for producing polyethylene and a process configuration with one slurry and two gas phase reactors especially for producing polypropylene grades.

Before the catalyst enters into the actual polymerization process, i.e. into the first polymerization reactor, it is typically treated in a pre-polymerization reactor being part of the process configuration in order to improve the polymer particle morphology. This is often desired since the slurry loop polymerization conditions are such that the local reaction rates are quite high, and fresh catalyst particles, especially the highly active ones used in this process, would not maintain their integrity and they would not exhibit good polymer powder morphology without the pre-polymerization step.

In the well-known multi-stage processes for producing polyethylene and polypropylene, the pre-polymerization step is carried out in a continuous mode. Thus, residence time of single particles in the pre-polymerization reactor varies resulting in catalyst/polymer particles with different polymerization histories and sizes, i.e. a broad particle size distribution. The broad catalyst particle size distribution of the polymer particles produced in the pre-polymerizer is in many instances susceptible in causing many operability issues in the subsequent polymerization rectors associated to fines generation, segregation phenomena, poor fluidization and excessive sheeting and chunking in the gas phase reactors.

Thus, there is still a need in the art for improving the initial polymerization degree of the catalyst particles before the actual polymerization process resulting in a more homogeneous polymerization and making sure that all catalyst particles will exhibit the same residence time at the beginning of the process. Furthermore, it is desired that almost all catalyst particles are grown up to a certain size, thus avoiding the presence of very small size particles (i.e., fines, broken particles) due to e.g. uncontrollable fragmentation. In addition thereto, it is desired to improve the particle size distribution developments of the polyolefins prepared in the subsequent polymerization process.

The finding of the present invention is that pre-polymerized solid Ziegler-Natta catalysts prepared by off-line pre-polymerization with a $C_2$ to $C_4$ olefin monomer before feeding it to the polymerization process results in narrower particle size distribution of the polymer collected after the continuous pre-polymerization stage and after the actual polymerization.

Accordingly, the present invention is directed to a continuous multi-stage process for producing a $C_2$ to $C_8$ olefin polymer composition in a process comprising at least two reactors. The process comprises the steps of:

a) introducing a stream of a pre-polymerized solid Ziegler-Natta catalyst, a monomer of $C_2$ to $C_8$ olefin into a first polymerization reactor, producing thereby a first $C_2$ to $C_8$ olefin polymer, b) withdrawing a stream comprising the first $C_2$ to $C_8$ olefin polymer from the first polymerization reactor and passing it into a second polymerization reactor;

c) introducing a stream of a monomer of $C_2$ to $C_8$ olefin into the second polymerization reactor, producing thereby a first polymer mixture comprising the first $C_2$ to $C_8$ olefin polymer and a second polymer of the $C_2$ to $C_8$ olefin monomer in the second polymerization reactor;

d) withdrawing a stream comprising the first polymer mixture from the second polymerization reactor;

wherein the pre-polymerized solid Ziegler-Natta catalyst is prepared by off-line pre-polymerization of a solid Ziegler-Natta catalyst component with a $C_2$ to $C_4$ olefin monomer before feeding to the polymerization process, and wherein the pre-polymerized solid Ziegler-Natta catalyst has a particle size distribution span $((d_{90}-d_{10})/d_{50})$ of below 1.5.

The first polymerization reactor in step a) is the first actual polymerization reactor. The process configuration may comprise a pre-polymerization step preceding the first actual polymerization step. Such pre-polymerization step is thus part of the continuous process, called in the present application as a "process pre-polymerization step". The process pre-polymerization step is typically conducted in a pre-polymerization reactor preceding the first polymerization reactor.

The catalyst pre-polymerization step is conducted off-line, i.e. separately from the polymerization configuration. The off-line pre-polymerization step is called catalyst pre-polymerization (step) or off-line catalyst pre-polymerization (step), and catalyst prepared is called (off-line) pre-polymerized solid (Ziegler-Natta) catalyst.

It has surprisingly been found out that such a process results in catalyst particles having initially the same polymerization degree before the actual polymerization process and thus resulting in a more homogeneous polymerization and same residence time at the beginning of the polymerization process. Moreover, almost all catalyst particles are grown up to a certain size, and thus the population of very small size particles (i.e., fines, broken particles) is decreased.

Furthermore, the particle size distribution developments of the polyolefins prepared in the subsequent polymerization process is improved.

In one embodiment, the solid Ziegler-Natta catalyst component comprises (a1) a compound of a transition metal (TM), which transition metal is selected from one of the groups 4 to 6 of the periodic table (IUPAC), preferably a titanium compound, (a2) a compound of a metal (M) which metal is selected from one of the groups 1 to 3 of the periodic table (IUPAC), preferably a metal of group 2 of the periodic table (IUPAC), more preferably a magnesium compound, and (a3) optionally an internal donor (ID) and (a4) optionally a compound of a group 13 metal of the periodic table (IUPAC), preferably an aluminum compound.

In another embodiment, the solid Ziegler-Natta catalyst component is in the form of particles having a mean particle size ranging from 3 to 200 µm, preferably from 5 to 100 µm. In a further preferred embodiment, the solid Ziegler-Natta catalyst component is in the form of particles having a mean particle size ranging from 5 to 45 µm.

In yet another embodiment, the off-line catalyst pre-polymerization is carried out in the presence of a co-catalyst (Co) and optionally in the presence of an external electron donor (ED).

In another embodiment, the off-line catalyst pre-polymerization is carried out with a total residence time of 5 to 55 minutes, preferably 10 to 45 minutes, more preferably 15 to 35 minutes.

In one embodiment the off-line catalyst pre-polymerization degree is from 0.1 to 50 $g_{polymer}/g_{cat}$, preferably from 0.2 to 40 $g_{polymer}/g_{cat}$, even more preferably from 0.5 to 30 $g_{polymer}/g_{cat}$, still more preferably from 1 to 25 $g_{polymer}/g_{cat}$, especially 1.2 to 25 $g_{polymer}/g_{cat}$.

In another embodiment, the off-line catalyst pre-polymerization is carried out in a medium, preferably the medium is an oil or a hydrocarbon solvent.

In yet another embodiment, the off-line catalyst pre-polymerization is carried out at a temperature in the range from 0 to 50° C., preferably from 0 to 30° C.

In one embodiment, the pre-polymerized solid Ziegler-Natta catalyst has a particle size distribution span $((d_{90}-d_{10})/d_{50})$ of below 1.2. In another embodiment, the first polymerization reactor in step a) is a loop reactor.

In yet another embodiment, the process comprises at least one gas phase reactor.

In one embodiment, the process comprises a further step e) of introducing the stream of step d) and a stream of a monomer of $C_2$ to $C_8$ olefin to a third polymerization reactor, wherein a second polymer mixture is produced.

In another embodiment, the process further comprises a step f) of withdrawing a stream comprising the second polymer mixture from the third polymerization reactor.

In yet another embodiment, the process comprises two loop reactors and one gas phase reactor.

In one embodiment, the process comprises one loop reactor and two gas phase reactors.

In another embodiment, the process further comprises a step g) of introducing the second polymer mixture to a fourth polymerization reactor together with additional monomers selected from $C_2$ to $C_8$ olefins, whereby a third polymer mixture is produced.

In the following, the present invention is described in more detail.

The continuous multi-stage process for producing a $C_2$ to $C_8$ olefin polymer composition in a process comprising at least two reactors, the process comprising the steps of:

a) introducing a stream of a pre-polymerized solid Ziegler-Natta catalyst, a monomer of $C_2$ to $C_8$ olefin into a first polymerization reactor, producing thereby a first $C_2$ to $C_8$ olefin polymer, b) withdrawing a stream comprising the first $C_2$ to $C_8$ olefin polymer from the first polymerization reactor and passing it into a second polymerization reactor;

c) introducing a stream of a monomer of $C_2$ to $C_8$ olefin into the second polymerization reactor, producing thereby a first polymer mixture comprising the first $C_2$ to $C_8$ olefin polymer and a second polymer of the $C_2$ to $C_8$ olefin monomer in the second polymerization reactor;

d) withdrawing a stream comprising the first polymer mixture from the second polymerization reactor;

wherein the pre-polymerized solid Ziegler-Natta catalyst is prepared by off-line pre-polymerization of a solid Ziegler-Natta catalyst component with a $C_2$ to $C_4$ olefin monomer before feeding to the polymerization process, and wherein the pre-polymerized solid Ziegler-Natta catalyst has a particle size distribution span $((d_{90}-d_{10})/d_{50})$ of below 1.5.

According to step a), a stream of a pre-polymerized solid Ziegler-Natta catalyst, a monomer of $C_2$ to $C_8$ olefin is introduced into a first polymerization reactor, producing thereby a first $C_2$ to $C_8$ olefin polymer.

According to a preferred embodiment, the process comprises an on-line pre-polymerization step preceding the first polymerization reactor, whereby the off-line pre-polymerized solid Ziegler-Natta catalyst is first introduced into the on-line pre-polymerization step and from there to the first polymerization reactor.

Thus, it is one requirement of the present invention that an off-line pre-polymerized solid Ziegler-Natta catalyst is provided. It is further required that the pre-polymerized solid Ziegler-Natta catalyst is prepared by off-line pre-polymerization of a solid Ziegler-Natta catalyst component with a $C_2$ to $C_4$ olefin monomer before feeding to the polymerization process.

In general, the solid Ziegler-Natta catalyst component comprises a compound of a transition metal (TM), which transition metal is selected from one of the groups 4 to 6 of the periodic table (IUPAC). Preferably, the compound of a transition metal (TM) is a titanium compound, most preferably a titanium halide, like $TiCl_4$.

Additionally, the catalyst comprises a compound of a metal (M) which metal is selected from one of the groups 1 to 3 of the periodic table (IUPAC). Preferably, the catalyst comprises a metal of group 2 of the periodic table (IUPAC), more preferably a magnesium compound.

In one embodiment, the solid Ziegler-Natta catalyst component thus comprises (a1) a compound of a transition metal (TM), which transition metal is selected from one of the groups 4 to 6 of the periodic table (IUPAC), preferably a titanium compound, (a2) a compound of a metal (M) which metal is selected from one of the groups 1 to 3 of the periodic table (IUPAC), preferably a metal of group 2 of the periodic table (IUPAC), more preferably a magnesium compound, (a3) optionally an internal donor (ID), and (a4) optionally a compound of a group 13 metal of the periodic table (IUPAC), preferably an aluminum compound.

If an internal donor (ID) is present, the internal donor (ID) is selected from among others, esters of carboxylic acids or dicarboxylic acids, like phthalates, maleates, substituted maleates, benzoates, and succinates, ethers and di-ethers or oxygen or nitrogen containing silicon compounds, or mixtures thereof.

The solid Ziegler-Natta catalyst component is typically a supported catalyst, wherein the support material is a particulate support, typically inorganic oxide support, such as silica, alumina, titania, silica-alumina, silica-titania or a $MgCl_2$ based support onto which catalyst compounds s are loaded. Preferably, the support is silica or a $MgCl_2$ based support.

Alternatively, the solid Ziegler-Natta catalyst component is prepared without using any external support material, but instead is formed by a method where all catalyst compounds are contacted and/or reacted in liquid with each other, and after that the solid catalyst is formed. The solid catalyst particles are formed via emulsion-solidification or via precipitation method.

In addition to the solid catalyst component the Ziegler-Natta catalyst preferably comprises a co-catalyst. The co-catalyst is typically a compound of a group 13 metal of the periodic table (IUPAC), preferably an aluminum compound. For example, the co-catalyst typically comprises an aluminum trialkyl or aluminum alkyl halide compound, wherein alkyl groups typically contain 1 to 20 C-atoms, e.g. 1 to 10 C-atoms. The aluminum alkyl compound is preferably trialkyl aluminum, such as trimethylaluminum, triethylaluminum, tri-isobutylaluminum or tri-n-octylaluminum or dialkylaluminum halide, alkyl aluminum dihalide or alkyl aluminum sesquihalide, such as diethylaluminum chloride, dimethylaluminum chloride, ethylaluminum dichloride or ethylaluminum sesquichloride. In one specific embodiment, the co-catalyst (Co) is triethylaluminum (TEAL).

Further, the catalyst may comprise an external electron donor. Suitable external electron donors (ED) are well known in the art and include ethers, ketones, amines, alcohols, phenols, phosphines and silanes. Silane type external donors are typically organosilane compounds containing Si—OCOR, Si—OR, or Si—NR$_2$ bonds, where R is an alkyl, alkenyl, aryl, arylalkyl or cycloalkyl with 1-20 carbon atoms are known in the art.

It is especially preferred to use silanes selected from compounds of the general formula wherein $R^a$, $R^b$ and $R^c$ denote a hydrocarbyl radical, in particular an alkyl or cycloalkyl group, and wherein p and q are numbers ranging from 0 to 3 with the sum p+q being equal to or less than 3. $R^a$, $R^b$ and $R^c$ can be chosen independently from one another and are linear, branched or cyclic hydrocarbyl groups having 1 to 12 carbon atoms, preferably $R^a$, $R^b$ and $R^c$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

External donors are typically used in propylene polymerization, but use in ethylene polymerization is also known.

Co-catalyst and the optional external electron donors are thus not part of the solid catalyst component, but fed as separate components into the off-line pre-polymerization and/or into the polymerization process.

Examples of suitable catalysts and compounds in catalysts are shown among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754, WO 03/000755, WO 2004/029112, EP 2610271, WO 2012/007430. WO 92/19659, WO 92/19653, WO 92/19658, U.S. Pat. Nos. 4,382,019, 4,435, 550, 4,465,782, 4,473,660, 4,560,671, 5,539,067, U.S. Pat. No. 5,618,771, EP45975, EP45976, EP45977, WO 95/32994, U.S. Pat. Nos. 4,107,414, 4,186,107, 4,226,963, 4,347,160, 4,472,524, 4,522,930, 4,530,912, 4,532,313, 4,657,882, 4,581,342, 4,657,882.

The solid Ziegler-Natta catalyst component is desirably in the form of particles having generally a mean particle size ranging from 3 to 200 μm, preferably from 5 to 100 μm, more preferably 5 to 45 μm. Moreover, the solid Ziegler-Natta catalyst component according to the present invention may in one embodiment be in the form of particles having generally a mean particle size ranging from 5 to 40 μm.

Suitable solid Ziegler-Natta catalyst components preferably contain a magnesium compound, an aluminum compound and a titanium compound supported on a particulate support.

The mean particle size of the silica support is most typically from 5 to 100 μm. However, it has turned out that special advantages can be obtained if the support has a mean particle size from 5 to 30 μm, preferably from 6 to 28 μm. Alternatively, in some less preferred cases the support may have a bigger mean particle size of from 30 to 80 μm, like from 30 to 50 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminum compound is a chlorine containing aluminum alkyl. Especially preferred compounds are aluminum alkyl dichlorides, aluminum dialkyl chlorides and aluminum alkyl sesquichlorides.

The solid Ziegler-Natta catalyst component can be prepared by sequentially contacting the carrier with the above mentioned compounds, as described in EP 688794 or WO 99/51646. Alternatively, it can be prepared by first preparing a solution from the components and then contacting the solution with a carrier, as described in WO 01/55230.

Another group of suitable solid Ziegler-Natta catalyst components for producing polyethylenes contain a titanium compound together with a magnesium halide compound acting as a support. Thus, the catalyst contains a titanium compound and optionally a Group 13 compound, for example an aluminum compound on a magnesium dihalide, like magnesium dichloride. Such catalysts are disclosed, for instance, in WO 2005/118655, EP 810235, WO2014/096296 and WO2016/097193.

One specific type of a solid Ziegler-Natta catalyst component for ethylene polymerization is a solid $MgCl_2$ supported catalyst component comprising an internal organic compound (also called in this application as an internal electron donor (ID)) of formula (I) or isomers or mixtures therefrom and
wherein in the formula (I)
$R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, the two oxygen-containing rings are individually saturated or partially unsaturated or unsaturated, and R in the adduct $MgCl_2*mROH$ is a linear or branched alkyl group with 1 to 12 C atoms, and m is 0 to 6.

It is required that the solid Ziegler-Natta catalyst component used in the multi-stage process of the present invention is subjected into an off-line pre-polymerization step before feeding to the actual polymerization process. The solid Ziegler-Natta catalyst component is thereby pre-polymerized with one or more olefin monomer(s) selected from $C_2$, $C_3$ or $C_4$ olefin monomers and mixtures thereof to obtain the pre-polymerized solid Ziegler-Natta catalyst.

Preferably, the pre-polymerization of the solid Ziegler-Natta catalyst component is carried out with an olefin monomer selected from straight chain $C_3$ or $C_4$ olefin monomer More preferably, the pre-polymerization of the solid Ziegler-Natta catalyst component is carried out with propylene.

It is further preferred that the off-line pre-polymerization of the solid Ziegler-Natta catalyst component is carried out in the presence of a co-catalyst and optionally in the presence of hydrogen. In addition, in some embodiments also an external electron donor may be present during off-line pre-polymerization, as defined above, typically selected from silanes.

The mol ratio of the external electron donor (ED) to the compound of a transition metal (TM) [ED:TM] during the off-line pre-polymerization step is from 0 to 5 mol/mol, and if present, preferably from 0.5 to 3 mol/mol.

It is appreciated that the off-line catalyst pre-polymerization is preferably carried out in the presence of a co-catalyst (Co) being a compound of group 13 metal, more preferably an Al compound, as defined above.

Additionally the mol ratio of the co-catalyst (Co) to the compound of a transition metal (TM) [Co/TM] during the off-line pre-polymerization step is in the range of 0.1 to 10 mol/mol, preferably in the range of 0.2 to 5 mol/mol.

The off-line catalyst pre-polymerization of the solid Ziegler-Natta catalyst component may be carried out with a total residence time of 5 to 55 minutes, preferably 10 to 45 minutes, more preferably 15 to 35 minutes. The term "residence time" refers to how much time the catalyst pre-polymerization composition spends in the reactor of off-line pre-polymerization. The term "total residence time" refers to the sum of all residence times in off-line pre-polymerization reactors in case more than one pre-polymerization step is employed. However, it is preferred according to the present invention that off-line pre-polymerization is done in one step only. Longer residence times are normally employed in the prior art, in order to avoid an overheating of the catalyst particles. Overheating will lead to agglomeration and thus an unfavorable particle size distribution. However, according to the present application, it is possible to avoid the overheating effect even at low residence times, especially when using a small catalyst particle size. Thus, agglomeration is reduced so that a narrow catalyst particle size distribution span is obtained. A narrow catalyst particle size distribution span will lead to polymer particles also having a narrow particle size distribution span (replica effect) which is an advantage as such, e.g. in terms of polymer properties and handling, etc.

The pre-polymerization of the solid Ziegler-Natta catalyst component is conducted off-line, in a medium. The medium is preferably an oil or a hydrocarbon solvent.

If the medium is an oil, the oil is preferably selected such that its density is sufficiently low and the viscosity of the pre-polymerized solid Ziegler-Natta catalyst/medium mixture is sufficiently high to prevent the catalyst particles from segregation during transport and feeding into process step a). Such viscous substance can be an oil or a mixture of an oil with a solid or highly viscous substance (oil-grease). The viscosity of such a medium is usually 100 to 15 000 cP at room temperature.

Alternatively, the medium is a hydrocarbon solvent. The hydrocarbon solvent to be employed in pre-polymerization may be selected among aromatic and aliphatic straight chain, branched and cyclic hydrocarbons with 5 to 20 carbon atoms, more preferably 5 to 12 carbon atoms, or mixtures thereof. Suitable hydrocarbon solvents include benzene, toluene, cumene, xylene, pentane, hexane, heptane, octane and nonane, preferably hexane and heptane, in particular n-heptane.

The off-line pre-polymerization of the solid Ziegler-Natta catalyst component is most preferably carried out at a temperature ranging from 0 to 50° C., and preferably from 0 to 30° C.

In another embodiment, wherein the catalyst pre-polymerization degree is from 0.1 to 50 $g_{polymer}/g_{cat}$, preferably from 0.2 to 40 $g_{polymer}/g_{cat}$, even more preferably from 0.5 to 30 $g_{polymer}/g_{cat}$, still more preferably from 1 to 25 $g_{polymer}/g_{cat}$, pre-polymerization, especially 1.2 to $g_{polymer}/g_{cat}$.

When the off-line pre-polymerized catalyst is fed to the process pre-polymerization, the off-line pre-polymerized solid Ziegler-Natta catalyst obtained by the off-line pre-polymerization process has also an advantageously narrow particle size distribution. The off-line pre-polymerized solid Ziegler-Natta catalyst has a particle size distribution span $((d_{90}-d_{10})/d_{50})$ of below 1.5, preferably below 1.2. For example, the off-line pre-polymerized solid Ziegler-Natta catalyst has a particle size distribution span $((d_{90}-d_{10})/d_{50})$ in the range from 1.0 to 1.5, preferably from 1.0 to 1.2.

As already mentioned above, the off-line pre-polymerized solid Ziegler-Natta catalyst is advantageously used for producing a $C_2$ to $C_8$ olefin polymer composition in a process comprising at least two reactors.

The off-line pre-polymerized solid Ziegler-Natta catalyst is thus further fed into a polymerization process. More precisely, a stream of the off-line pre-polymerized solid Ziegler-Natta catalyst and a monomer of $C_2$ to $C_8$ olefin is introduced into a first polymerization reactor, producing thereby a first $C_2$ to $C_8$ olefin polymer. Preferably, the off-line pre-polymerized solid Ziegler-Natta catalyst is fed to the first polymerization reactor.

Thus, a monomer of $C_2$ to $C_8$ olefin is polymerized in the presence of the pre-polymerized solid Ziegler-Natta catalyst.

It is appreciated that the monomer of $C_2$ to $C_8$ olefin is preferably selected from ethylene, propylene, 1-butene, isopentene, 1-hexene, 1-octene and mixtures thereof. Preferably, the monomer of $C_2$ to $C_8$ olefin is selected from ethylene and/or propylene and optionally 1-butene and 1-hexene.

Polymers to be prepared are thus preferably ethylene homopolymers; ethylene copolymers with $C_4$ to $C_8$, preferably with $C_4$ to G, comonomer or mixtures thereof; or propylene homopolymers or propylene copolymers with ethylene or $C_4$ to $C_8$, preferably with ethylene or $C_4$ to $C_6$ comonomers or mixtures thereof.

The equipment used for step a) can comprise any polymerization reactor of conventional design for producing propylene or ethylene homo- or copolymers.

The term "polymerization reactor" shall indicate that the main polymerization takes place. Thus, in case the process consists of two polymerization reactors, this definition does not exclude the option that the overall process comprises for instance a pre-polymerization step in a pre-polymerization reactor. The term "consist of" is only a closing formulation in view of the main polymerization reactors.

Preferably, the first polymerization reactor is a conventional stirred-tank slurry reactor, as described in WO 94/26794, or a gas phase reactor.

For the purpose of the present invention, "slurry reactor" designates any reactor, such as a continuous or simple batch stirred tank reactor or loop reactor, operating in bulk or slurry. "Bulk" means a polymerization in reaction medium that comprises at least 60 wt.-% monomer, typically used a propylene polymerization process. By "gas phase reactor" is meant any mechanically mixed or fluid bed reactor. Preferably the gas phase reactor comprises a mechanically agitated fluid bed reactor with gas velocities of at least 0.2 m/sec.

The first polymerization reactor in step a) is preferably a slurry reactor and is preferably a (bulk) loop reactor.

The stream comprising the first $C_2$ to $C_8$ olefin polymer is withdrawn from the first polymerization reactor and passed into a second polymerization reactor (step b).

The second polymerization reactor can be a conventional slurry reactor, preferably a (bulk) loop reactor, or a gas phase reactor.

With regard to the slurry reactor and gas phase reactor and preferred embodiment thereof, it is referred to the information provided above when discussing the first polymerization reactor.

Thus, in a preferred embodiment the first polymerization reactor (step a)) is a slurry reactor, like loop reactor, whereas the second polymerization reactor (steps b) and c)) is a gas phase reactor. Alternatively, the first and second polymerization reactors (steps a), b) and c)) are preferably slurry reactors, like loop reactors.

In one embodiment, the process of the present invention thus comprises at least one gas phase reactor.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer on such flowing rate, which will make the particles act as a fluid. The fluidizing gas can contain also inert carrier gases, like nitrogen and also hydrogen as a polymer molecular weight controlling agent. The fluidized gas phase reactor can be equipped with a mechanical mixer.

The gas phase reactor, typically the fluidized bed polymerization reactor, is preferably operated at a temperature within the range of from 50 to 100° C., preferably from 65 to 90° C. The pressure is suitably from 10 to 40 bar, preferably from 15 to 30 bar.

According to step c) of the present process, a stream of a monomer of $C_2$ to $C_8$ olefin is further introduced into the second polymerization reactor, producing thereby a first polymer mixture comprising the first $C_2$ to $C_8$ olefin polymer (obtained in the first polymerization reactor) and a second polymer of the $C_2$ to $C_8$ olefin monomer in the second polymerization reactor. According to step d) of the present process, a stream comprising the first polymer mixture is withdrawn from the second polymerization reactor.

With regard to the stream of a monomer of $C_2$ to $C_8$ olefin and preferred embodiment thereof, it is referred to the information provided above when discussing the stream of a monomer of $C_2$ to $C_8$ olefin introduced into the first polymerization reactor.

In view of the above, it is appreciated that the multi-stage process of the present invention is conducted in at least two polymerization reactors. Thus, the stream comprising the first polymer mixture withdrawn from the second polymerization reactor (step d)) is preferably bimodal.

A preferred embodiment of the invention comprises carrying out process steps a) and c) in loop and gas phase reactors in a cascade where the loop reactor operates in liquid olefin monomer and at high polymerization temperatures. It is possible to have a flash between loop the gas phase reactors. The polymerization in the second polymerization reactor, i.e. step c), is preferably carried out in a gas phase reactor in order to broaden the molar mass distribution of the polymer.

In addition to the actual polymerization reactors used for producing the $C_2$ to $C_8$ olefin polymer composition, the polymerization reaction system can also include additional reactors, such as pre- and/or post reactors, as typically used and being well known in the art.

The polymerization step a) of the present process may be preceded by a pre-polymerization step being part of the process configuration (on-line pre-polymerization). The purpose of the pre-polymerization is to polymerize a small amount of polymer onto the catalyst at a low temperature and/or a low monomer concentration. By pre-polymerization it is possible to improve the performance of the catalyst in slurry and/or modify the properties of the final polymer. The on-line pre-polymerization step preceding step a) of the present invention may be conducted in slurry or in gas phase. Preferably, the on-line pre-polymerization preceding step a) of the present invention is conducted in slurry.

Thus, the on-line pre-polymerization step may be conducted in a loop reactor. In a process for producing ethylene polymers, the on-line pre-polymerization is preferably conducted in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms or a mixture of such hydrocarbons. The temperature in the on-line pre-polymerization step is typically from 0 to 90° C., preferably from 20 to 70° C. and more preferably from 30 to 60° C.

The pressure is not critical and is typically from 1 to 150 bar, preferably from 10 to 100 bar.

In a process for producing propylene polymers, the on-line pre-polymerization is conducted in a continuous manner as bulk slurry polymerization in liquid propylene, i.e. the liquid phase mainly comprises propylene, with minor amount of other reactants and optionally inert components dissolved therein. Preferably the pre-polymerization is conducted in a continuous stirred tank reactor or a loop reactor. The temperature is typically in the range of 0 to 60° C., preferably from 10 to 50° C., and more preferably from 20 to 45° C. The pressure in the pre-polymerization reactor is not critical but must be sufficiently high to maintain the reaction mixture in liquid phase. Thus, the pressure may be from 20 to 100 bar, for example to 70 bar.

In one embodiment, the multi-stage process of the present invention comprises a further step e) of introducing the stream of step d) and a stream of a monomer of $C_2$ to $C_8$ olefin into a third polymerization reactor, wherein a second polymer mixture is produced.

The third polymerization reactor is preferably a gas phase reactor.

With regard to the slurry reactor and gas phase reactor and preferred embodiment thereof, it is referred to the information provided above when discussing the first polymerization reactor.

Thus, in a preferred embodiment the first polymerization reactor (step a)) is preferably a slurry reactor, like loop reactor, whereas the second and third polymerization reactors (steps c) and e)) are gas phase reactors. Accordingly, preferably three polymerization reactors, namely a slurry reactor (SR), like loop reactor (LR), a first gas phase reactor (GPR-1), and a second gas phase reactor (GPR-2) connected in series are used.

Alternatively, the first and second polymerization reactors (steps a) and b)) are preferably slurry reactors, like loop reactors, and the third polymerization reactor (step e)) is a gas phase reactor. Accordingly, preferably three polymerization reactors, namely a first slurry reactor (SR-1), like loop reactor (LR-1), a second slurry reactor (SR-2), like loop reactor (LR-2), and a first gas phase reactor (GPR-1) connected in series are used.

Thus, the process of the present invention preferably comprises two loop reactors and one gas phase reactor. This embodiment is especially suitable for producing ethylene polymers.

Alternatively, the process of the present invention comprises one loop reactor and one or two gas phase reactors. This embodiment is especially suitable for producing propylene polymers.

According to step e) of the present process, a stream of a monomer of $C_2$ to $C_8$ olefin is further introduced into the third polymerization reactor, producing thereby a second polymer mixture comprising the first and second $C_2$ to $C_8$ olefin polymer (obtained in the first and second polymerization reactors) and a third polymer of the $C_2$ to $C_8$ olefin monomer produced in the third polymerization reactor.

With regard to the stream of a monomer of $C_2$ to $C_8$ olefin and preferred embodiment thereof, it is referred to the information provided above when discussing the stream of a monomer of $C_2$ to $C_8$ olefin introduced into the first polymerization reactor.

In view of the above, it is appreciated that the multi-stage process of the present invention can be conducted in at least three polymerization reactors.

Preferably, the multi-stage process of the present invention further comprises a step f) of withdrawing a stream comprising the second polymer mixture from the third polymerization reactor and optionally introducing said second polymer mixture to a fourth polymerization reactor together with additional monomers selected from $C_2$ to $C_8$ olefins, whereby a third polymer mixture is produced comprising the first and second and third $C_2$ to $C_8$ olefin polymer (obtained in the first and second and third polymerization reactors) and a fourth polymer of the $C_2$ to $C_8$ olefin monomer produced in the fourth polymerization reactor (step g). The optional fourth polymerization reactor is preferably a gas phase reactor.

With regard to the stream of a monomer of $C_2$ to $C_8$ olefin and preferred embodiment thereof, it is referred to the information provided above when discussing the stream of a monomer of $C_2$ to $C_8$ olefin introduced into the first polymerization reactor.

Thus, the multi-stage process of the present invention may be conducted in at least three polymerization reactors, such as in four polymerization reactors.

With regard to the slurry reactor and gas phase reactor and preferred embodiment thereof, it is referred to the information provided above when discussing the first polymerization reactors.

A preferred multi-stage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479, WO 00/68315, EP2186833 or in EP2860203.

The $C_2$ to $C_8$ olefin polymer obtained by the multi-stage process for producing a $C_2$ to $C_8$ olefin polymer composition in a process comprising at least two reactors can be pelletized and compounded using any of the variety of compounding and blending methods well known and commonly used in the resin compounding art.

In the following the present invention is further illustrated by means of examples.

EXAMPLES

1. Measuring Methods

The following definitions of terms and determination methods apply for the above general description of the invention as well as to the below examples unless otherwise defined. Particle size distribution [mass percent] and particle sizes were determined by laser diffraction measurements by Coulter LS 200.

Particle size distribution (PSD) defined by SPAN:

$$\text{Span} = \frac{D90 - D10}{D50}$$

The particle size and particle size distribution is a measure for the size of the particles. The D-values ($D_{10}$ (or $d_{10}$), $D_{50}$ (or $d_{50}$) and $D_{90}$ (or $d_{90}$)) represent the intercepts for 10%, 50% and 90% of the cumulative mass of sample. The D-values can be thought of as the diameter of the sphere which divides the sample's mass into a specified percentage when the particles are arranged on an ascending mass basis. For example the $D_{10}$ is the diameter at which 10% of the sample's mass is comprised of particles with a diameter less than this value. The $D_{50}$ is the diameter of the particle where 50% of a sample's mass is smaller than and 50% of a sample's mass is larger than this value. The $D_{90}$ is the diameter at which 90% of the sample's mass is comprised of particles with a diameter less than this value. The $D_{50}$ value is also called median particle size. From laser diffraction measurements according to ASTM 13320-1 the volumetric D-values are obtained, based on the volume distribution.

The distribution width or span of the particle size distribution is calculated from the D-values $D_{10}$, $D_{50}$ and $D_{90}$ according to the below formula:

$$\text{Span} = \frac{D90 - D10}{D50}$$

The mean particle size corresponds to the average particle size. From laser diffraction measurements according to ASTM 13320-1 the volume based mean particle size is obtained and calculated as follows:

$$\bar{D}_{pq}^{(p-q)} = \frac{\sum D_i^p}{\sum D_i^q}$$

wherein $\bar{D}$=the average or mean particle size (p−q)=the algebraic power of $D_{pq}$, whereby p>q $D_i$=the diameter of the ith particle $\Sigma$=the summation of $D_{ip}$ or $D_{iq}$ representing all particles in the sample Only in symmetric particle size distributions the mean particle size and the median particle size $D_{50}$ have the same value.

Unless specifically otherwise defined, the percentage numbers used in the text below refer to percentage by weight.

2. Examples

Solid Ziegler-Natta Catalyst Preparation

The catalyst used for the following examples was prepared according to the catalyst preparation example of WO2017207493.

Raw Materials

The standard 10 and 25 wt % TEA (triethyl aluminum) solutions in heptane were prepared by dilution of 100% TEA-S from Chemtura.

$MgCl_2$*3EtOH carriers were received from GRACE. 2,2-Di(2-tetrahydrofuryl)propane (DTHFP) was supplied by TCI EUROPE N.V. as a mixture (1:1) of diastereomers (D,L-(rac)-DTHFP and meso-DTHFP.

$TiCl_4$ was supplied by Aldrich (Metallic impurities<1000 ppm, Metals analysis>99.9%).

Preparation of Pre-Treated Support Material

A jacketed 160 dm³ stainless steel reactor equipped with a helical mixing element was pressurized with $N_2$ to 2.0 barg and depressurized down to 0.2 barg until the $O_2$ level was less than 3 ppm (barg is a measure of over-pressure, i.e. pressure above atmospheric pressure). The vessel was then charged with heptane (20.5 kg) and 2,2-di(tetrahydrofuryl) propane (0.512 kg; 2.78 mol; DTHFP). The obtained mixture was stirred for 20 min at 40 rpm. The $MgCl_2$-3EtOH carrier (6.5 kg; DTHFP/Mg=0.1 mol/mol; 27.2 mol of Mg; Mg 10.18 wt.-%, $d_{10}$=9.5 μm, $d_{50}$=17.3 μm and $d_{10}$=28.5 μm, granular shaped) was added to the reactor with stirring. This suspension was cooled to approximately −20° C. and 33 wt.-% solution of triethylaluminum (29.4 kg; 85.0 mol of Al; Al/EtOH=1.0 mol/mol) in heptane was added in aliquots during 2.5 h time while keeping the temperature below 10° C. After the TEA addition, the reaction mixture was gradually heated to 80° C. over a period of 2.4 h and kept at this temperature for additional 20 min at 40 rpm. The suspension was allowed to settle for 10 min, and the mother liquor was removed through a μm filter net in the bottom of the reactor during 15 min. The vessel was charged with warm toluene (43 kg) and then stirred at 40 rpm for 38 min at 55 to 70° C. The suspension was allowed to settle for 10 min at 50 to 55° C. and the liquid removed through a 10 μm filter net in the bottom of the reactor during 15 min.

Catalyst Preparation

The vessel containing the pre-treated support material was charged with toluene (43 kg) and then cooled to approximately 30° C. Neat $TiCl_4$ (5.17 kg, 27.5 mol; Ti/Mg=1.0 mol/mol) was added. The obtained suspension was heated to approximately 90° C. over a period of 2 h and kept at this temperature for one additional hour with stirring at 40 rpm. The suspension was allowed to settle for 10 min at approximately 90° C. and the mother liquor was removed through a 10 μm filter net in the bottom of the reactor during 15 min. The obtained solid material was washed twice with toluene (43 kg each) at ~90° C. and once with heptane (34 kg) at ~40° C. All three of these washing steps used the same sequence of events: addition of preheated (90 or 40° C.) solvent, then stirring at 40 rpm for 30 min, allowing the solid to settle for 10 min, and then removal of liquid through a 10 μm filter net in the bottom of the reactor during 15 min.

The obtained catalyst was mixed with 20 kg of white oil and dried 4 h at 40-50° C. with nitrogen flow (2 kg/h) and vacuum (−1 barg). The catalyst was taken out from the reactor and the reactor was flushed with another 20 kg of oil and taken out to the same drum. The dry catalyst yield was 3.60 kg (82.2% based on Mg).

Off-Line Pre-Polymerized Ziegler-Natta Catalyst

Diluted Ziegler-Natta catalyst oil slurry (37.37 kg containing 4.9 wt.-% of solid Ziegler-Natta catalyst as described above was added to the reactor at 20° C. followed by 33 wt.-% solution of TEAL in heptane (0.87 kg; Al/Ti=1.0 mol/mol). Off-line pre-polymerization was initiated almost immediately after TEAL addition (stirring time ~5 min) by continuous addition of propylene at 20-25° C. A target pre-polymerization degree was set equal to 2 g polymer/$g_{cat}$ and the desired degree of pre-polymerization was reached after 5 h 10 min (Example 7). The pressure was released and the reactor was flushed five times with nitrogen and then dried under vacuum for 1 h. Dried off-line pre-polymerized Ziegler-Natta catalyst in oil was taken out into a catalyst drum. The yield was 42.97 kg containing 13.9 wt.-% of off-line pre-polymerized Ziegler-Natta catalyst with pre-polymerization degree of 2 polymer g/$g_{cat}$. The off-line pre-polymerized Ziegler-Natta catalyst had a particle size distribution of $d_{10}$=10.0 μm, $d_{50}$=30.1 μm and $d_{90}$=47.3 μm (SPAN of 1.24).

Examples 1 to 4 below are simulated examples using Ziegler-Natta model catalysts having the particle size distribution of $d_{10}$=10 μm, $d_{50}$=20 μm and $d_{10}$=30 μm (SPAN of 1).

Example 1—Comparative

Model Catalyst mimicking the catalyst prepared according to Catalyst preparation example above (without off-line pre-polymerization) was polymerized in a continuous PE pre-polymerization reactor (on-line pre-polymerization). The residence time was 5 minutes, the temperature was 50° C. and the production rate was 3 Kg PE/$g_{cat}$/h. This example represents a case where the polymer particles stayed very short time in the on-line pre-polymerization reactor.

Subsequently, the polymer material from the on-line pre-polymerization step transferred to the first loop reactor and subsequently to the second loop reactor. The total residence time in the two loop reactors connected in series was equal to 60 mins, the temperature was equal to 90° C. in both loop reactors and the pressure was 63.5 bar in the first loop reactor and 62.5 in the second loop reactor. After a high pressure flashing step, the particulate material was transferred to the gas phase reactor (GPR) where 5% mol 1-butene was also added. The temperature in the GPR was 85° C., the pressure was 20 bar and several superficial gas velocity values selected between the range of 0.1 m/s to 0.5 m/s, having a nominal value equal to 0.4 m/s.

In GPR the particle overheating (i.e., the temperature difference between the particles surface and the gas phase, expressed as DT) was estimated for various superficial gas velocity values (SGV) showing the areas of good (SGV=0.5 m/s) and poor fluidization conditions (SGV=0.1 m/s).

As it is well understood in the art the superficial gas velocity denotes the velocity of the gas in an empty construction. Thus, the superficial gas velocity within the middle zone is the volumetric flow rate of the gas (in m³/s) divided by the cross-sectional area of the middle zone (in m²) and the area occupied by the particles is thus neglected.

Depending on the operating conditions (e.g., superficial gas velocity, mixing intensity, comonomer partial pressure, polymer particle size, etc.) the heat transfer limitation can lead to particle overheating, softening and, thus, agglomeration. In order to avoid the particle overheating and agglomeration.

The particle overheating (ΔTov) is defined as the temperature difference between the particles ($T_{PP}$) and the gas phase ($T_S$)

$\Delta Tov = T_{PP} - T_S$, wherein $\Delta Tov = Q_g/(hA_{PP})$, with $Q_g$ being the heat that is produced due to polymerization (it is calculated based on the polymerization kinetics, or reactor productivity), h being the external heat transfer coefficient and $A_{PP}$ is the external surface of the polymer particles.

$h = (k_g Nu)/D_{PP}$, wherein $k_g$ is the thermal conductivity of the gaseous mixture (transport property), $D_{PP}$ is the diameter of the polymer particles and Nu is a dimensionless number that is defined as the ratio of convective to conductive heat transfer across external boundary layer of the polymer particles and it very much depends on the superficial gas velocity (operating condition).

In the above calculation all temperatures are given in ° C.

More information regarding the calculation can be found in a well-established procedure that is described in articles: Gas-Phase Olefin Polymerization in the Presence of Supported and Self-Supported Ziegler-Natta Catalysts, V. Kanellopoulos, B. Gustafsson and C. Kiparissides, (2008), Macromolecular Reaction Engineering 2(3), pp.: 240-252 and in Comprehensive Analysis of Single-Particle Growth in Heterogeneous Olefin Polymerization: The Random-Pore Polymeric Flow Model, V. Kanellopoulos, G. Dompazis, B. Gustafsson and C. Kiparissides, (2004), Industrial & Engineering Chemistry Research 43(17), pp.: 5166-5180.

The results are shown in Table 1 below. It can be gathered that high particle overheating can be observed, especially for the large size catalyst particles, which can potentially result in severe operability issues.

TABLE 1

Tendency for agglomeration in GPR for various SGV and catalyst sizes
($t_{off-line\ pre-polymerization}$ = 0 mins, $t_{continuous\ prepol}$ = 5 mins).

| $d_{10}$ = 10 μm | | $d_{50}$ = 20 μm | | $d_{90}$ = 30 μm | |
| --- | --- | --- | --- | --- | --- |
| SGV = 0.1 m/s | SGV = 0.5 m/s | SGV = 0.1 m/s | SGV = 0.5 m/s | SGV = 0.1 m/s | SGV = 0.5 m/s |
| DT = 6° C. | DT = 4° C. | DT = 25° C. | DT = 15° C. | DT = 37° C. | DT = 22° C. |

Example 2—Inventive

The polymerization series described in Example 1 was repeated with the only difference that an off-line pre-polymerization step was employed where all catalyst particles experienced the same residence time of 30 minutes and off-line pre-polymerization degree of 20 polymer $g/g_{cat}$. The results are shown in Table 2 below. It can be gathered that by employing an off-line pre-polymerization step, the tendency of particle overheating in the gas phase is lower compared to the case where a continuous on-line pre-polymerization without an off-line pre-polymerization step was employed (as in Example 1).

TABLE 2

Tendency for agglomeration in GPR for various SGV and catalyst sizes
($t_{off-line\ prepol}$ = 30 mins, $t_{continuous\ prepol}$ = 5 mins).

| $d_{10}$ = 10 μm | | $d_{50}$ = 20 μm | | $d_{90}$ = 30 μm | |
| --- | --- | --- | --- | --- | --- |
| SGV = 0.1 m/s | SGV = 0.5 m/s | SGV = 0.1 m/s | SGV = 0.5 m/s | SGV = 0.1 m/s | SGV = 0.5 m/s |
| DT = 4° C. | DT = 3° C. | DT = 14° C. | DT = 9° C. | DT = 18° C. | DT = 10° C. |

Example 3—Comparative

Example 1 (Comparative) was repeated with the only difference being the residence time in the continuous on-line pre-polymerization step that is 30 min. The particle size distribution of the particles exiting the continuous pre-polymerizer ($d_p$) without a preceding off-line pre-polymerization step was measured. The results are shown in Table 3 below. It can be gathered that a broad PSD is obtained (i.e., span=1.66).

TABLE 3

Catalyst and particle size distribution in pre-polymerization without an off-line pre-polymerization step ($t_{off\text{-}line\ prepol}$ = 0 mins, $t_{continuous\ prepol}$ = 30 mins).

|  | Size (μm) | | | Width ($d_{90}$-$d_{10}$) | Span ($d_{90}$-$d_{10}$)/$d_{50}$ |
|---|---|---|---|---|---|
| $d_c$ | 10 | 20 | 30 | 20 | 1.0 |
| $d_p$ | 65 | 238 | 440 | 375 | 1.66 |

$d_c$ = particle size of the model catalyst before the off-line pre-polymerization step

Example 4—Inventive

Example 3 (Comparative) was repeated with the differences being that the catalyst was off-line pre-polymerized as in Example 2 before entering the continuous pre-polymerization step, where the residence time was also 30 min. The particle size distribution of the particles exiting the continuous pre-polymerizer ($d_p$) is shown. The results are shown in Table 4 below. It can be gathered that a narrow PSD is obtained (span 1.04).

TABLE 4

Catalyst and particle size in pre-polymerization with an off-line pre-polymerization step ($t_{off\text{-}line\ prepol}$ = 30 mins, $t_{continuous\ prepol}$ = 30 mins).

|  | Size (μm) | | | Width ($d_{90}$-$d_{10}$) | Span ($d_{90}$-$d_{10}$)/$d_{50}$ |
|---|---|---|---|---|---|
| $d_c$ | 10 | 20 | 30 | 20 | 1.0 |
| $d_p$ | 65 | 130 | 200 | 135 | 1.04 |

$d_c$ = particle size of the model catalyst before the off-line pre-polymerization step

Examples 5 and 6 (Comparatives) and Example 7 (Inventive)

Figure 1:
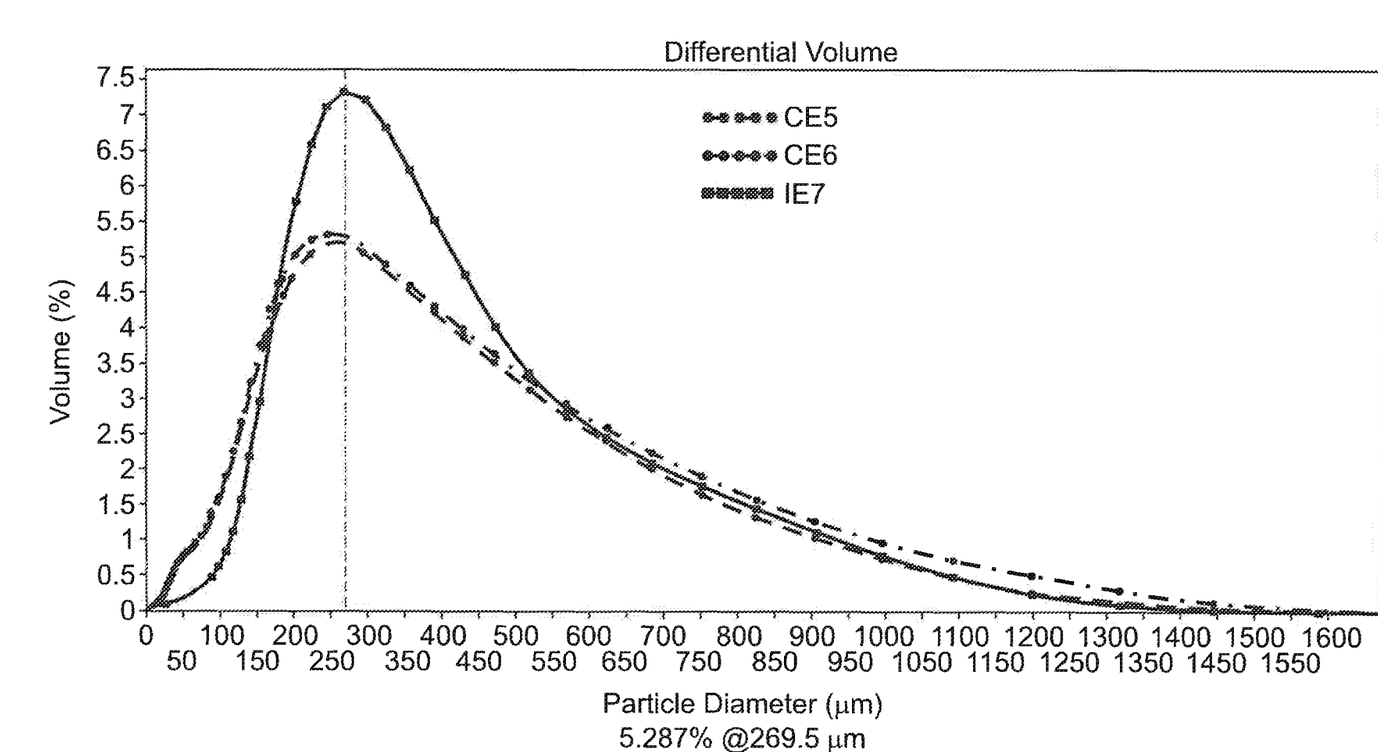
FIG. 1 refers to the particle size distribution of polyethylene obtained by using the inventive and comparative Ziegler-Natta catalysts of Examples 5-7.

The Ziegler-Natta catalyst described in the "Off-line pre-polymerized Ziegler-Natta catalyst" above was used in Example 7 (Inventive), and the same catalyst without off-line pre-polymerization step was used in Examples 5 and 6 (comparatives) (see Table 5). Catalysts were employed in a multi-stage polymerization process, consisting of a continuous pre-polymerization reactor and two slurry-phase loop polymerization reactors followed by a gas phase reactor connected in series. Polymerization in a continuous pre-polymerization reactor was conducted at a temperature of 60° C., and under pressure of 58 bar. Subsequently, the polymer material was transferred to the first loop reactor (T=95° C., and P=56 bar) and then to the second loop reactor (T=95° C. and P=54 bar). After that, flashing of the unreacted components and solvent carried out in a high pressure flash tank and the particulate material was transferred to a gas-solid fluidized bed reactor (GPR), where it was polymerized at temperature of 85° C., at 20 bar pressure using a superficial gas velocity of 0.3 m/s. All the reactors operating conditions, the various components feed streams rates, the production splits and representative properties of the produced polymers in each polymerization step of the multi-stage process are depicted in Table 5. The resulted particle size distribution curves are illustrated in FIG. 1 and the $D_{10}$, $D_{50}$ and $D_{90}$ values of the corresponding particle size distributions are reported in Table 5. As it can be seen, the final polymer particles produced by the off-line pre-polymerized Ziegler-Natta catalyst (Example 7, reported in Table 5) exhibit a much narrower particle size distribution (Span=1.6) compared to those ones produced by the Ziegler-Natta catalyst without any off-line pre-polymerization step (Span=2.11 and Span=2.18) of the prior art (Comparative Examples 5 and 6). Results are disclosed in Table 5.

TABLE 5

Summary of polymerization conditions Example 5 and 6 (Comparative) and Example 7 (Inventive).

| Catalyst | Example 5 Comparative (CE5) Ziegler-Natta catalyst | Example 6 Comparative (CE6) Ziegler-Natta catalyst | Example 7 Inventive (IE7) Off-line pre-polymerized Ziegler-Natta catalyst |
|---|---|---|---|
| Pre-polymerization reactor | | | |
| Temp. (° C.) | 60 | 60 | 60 |
| Press. (bar) | 58 | 58 | 58 |
| C2 (kg/h) | 2.0 | 2.0 | 2.0 |
| H2 (g/h) | 2.0 | 5.0 | 2.0 |
| Split % | 1.3 | 1.3 | 1.3 |
| First loop reactor | | | |
| Temp. (° C.) | 95 | 95 | 95 |
| Press. (bar) | 56 | 56 | 56 |
| C2 conc. (mol-%) | 4.1 | 3.9 | 3.5 |
| H2/C2 ratio | 529 | 469 | 572.5 |
| Split % | 16.4 | 16.4 | 16.4 |
| MFR2 (g/10 min) | 210 | 121 | 260 |
| Second loop reactor | | | |
| Temp. (° C.) | 95 | 95 | 95 |
| Press. (bar) | 54 | 54 | 54 |
| C2 conc. (mol-%) | 3.1 | 3.8 | 4.5 |

TABLE 5-continued

Summary of polymerization conditions Example 5 and 6 (Comparative) and Example 7 (Inventive).

| Catalyst | Example 5 Comparative (CE5) Ziegler-Natta catalyst | Example 6 Comparative (CE6) Ziegler-Natta catalyst | Example 7 Inventive (IE7) Off-line pre-polymerized Ziegler-Natta catalyst |
|---|---|---|---|
| H2/C2 ratio | 500 | 428 | 481 |
| Split % | 37 | 38 | 37 |
| MFR2 (g/10 min) | 360 | 216 | 440 |
| GPR | | | |
| Temp. (° C.) | 85 | 85 | 85 |
| Press. (bar) | 20 | 20 | 20 |
| H2/C2 ratio | 38 | 26 | 28 |
| C6/C2 ratio | 24.2 | 24.2 | 26.6 |
| Split % | 45.4 | 44.8 | 45.1 |
| Powder | | | |
| Density (kg/m$^3$) | 954 | 953 | 955 |
| MFR5 (g/10 min) | 0.18 | 0.13 | 0.21 |
| MFR21 (g/10 min) | 7.0 | 4.6 | 7.24 |
| D10 (μm) | 76 | 85 | 145 |
| D50 (μm) | 246 | 257 | 287 |
| D90 (μm) | 596 | 645 | 605 |
| SPAN | 2.11 | 2.18 | 1.60 |

The invention claimed is:

1. A continuous multi-stage process for producing a $C_2$ to $C_8$ olefin polymer composition in at least two reactors, the continuous multi-stage process comprising the steps of:
   a) introducing a stream of a pre-polymerized solid Ziegler-Natta catalyst and a monomer of $C_2$ to $C_8$ olefin into a first polymerization reactor, thereby producing in a first polymerization a first $C_2$ to $C_8$ olefin polymer;
   b) withdrawing a stream comprising the first $C_2$ to $C_8$ olefin polymer from the first polymerization reactor and passing it into a second polymerization reactor;
   c) introducing a stream of a monomer of $C_2$ to $C_8$ olefin into the second polymerization reactor, thereby producing in a second polymerization a first polymer mixture comprising the first $C_2$ to $C_8$ olefin polymer and a second $C_2$ to $C_8$ olefin polymer produced in the second polymerization reactor; and
   d) withdrawing a stream comprising the first polymer mixture from the second polymerization reactor, thereby obtaining the $C_2$ to $C_8$ olefin polymer composition;
   wherein the pre-polymerized solid Ziegler-Natta catalyst is prepared by off-line pre-polymerization of a solid Ziegler-Natta catalyst component with a $C_2$ to $C_4$ olefin monomer before feeding to the continuous multi-stage process, and wherein the pre-polymerized solid Ziegler-Natta catalyst has a particle size distribution span $((d_{90}-d_{10})/d_{50})$ of below 1.5.

2. The continuous multi-stage process according to claim 1, wherein the solid Ziegler-Natta catalyst component comprises:
   (a1) a compound of a transition metal (TM), which transition metal is selected from one of the groups 4 to 6 of the periodic table (IUPAC),
   (a2) a compound of a metal (M) which metal is selected from one of the groups 1 to 3 of the periodic table (IUPAC),
   (a3) optionally an internal donor (ID) and
   (a4) optionally a compound of a group 13 metal of the periodic table (IUPAC).

3. The continuous multi-stage process according to claim 1, wherein the solid Ziegler-Natta catalyst component is in the form of particles having a mean particle size ranging from 3 to 200 μm.

4. The continuous multi-stage process according to claim 1, wherein the off-line pre-polymerization is carried out in the presence of a co-catalyst (Co) and optionally in the presence of an external electron donor (ED); and/or
   wherein the off-line pre-polymerization is carried out with a total residence time of 5 to 55 minutes.

5. The continuous multi-stage process according to claim 1, wherein the off-line pre-polymerization degree is from 0.1 to 50 $g_{polymer}/g_{cat}$.

6. The continuous multi-stage process according to claim 1, wherein the off-line pre-polymerization is carried out in a medium, wherein the medium is an oil or a hydrocarbon solvent.

7. The continuous multi-stage process according to claim 1, wherein the off-line pre-polymerization is carried out at a temperature in a range from 0 to 50° C.

8. The continuous multi-stage process according to claim 1, wherein pre-polymerized solid Ziegler-Natta catalyst has a particle size distribution span $((d_{90}-d_{10})/d_{50})$ of below 1.2.

9. The continuous multi-stage process according to claim 1, wherein the first polymerization reactor in step a) is a loop reactor.

10. The continuous multi-stage process according to claim 1, wherein the process comprises at least one gas phase reactor.

11. The continuous multi-stage process according to claim 1, wherein the process comprises a further step e) of introducing the stream of step d) and a stream of a monomer of $C_2$ to $C_8$ olefin into a third polymerization reactor, thereby producing a second polymer mixture.

12. The continuous multi-stage process according to claim 11, wherein the process further comprises a step f) of withdrawing a stream comprising the second polymer mixture from the third polymerization reactor.

13. The continuous multi-stage process according to claim 11, wherein the process comprises two loop reactors and one gas phase reactor.

14. The continuous multi-stage process according to claim 11, wherein the process comprises one loop reactor and two gas phase reactors.

15. The continuous multi-stage process according to claim 12, wherein the process further comprises a step g) of introducing the second polymer mixture into a fourth polymerization reactor together with additional monomers selected from $C_2$ to $C_8$ olefins, thereby producing a third polymer mixture.

* * * * *